United States Patent Office 3,136,795
Patented June 9, 1964

---

3,136,795
MANUFACTURE OF ORGANOLEAD COMPOUNDS
Sidney M. Blitzer, Baton Rouge, La., Martin W. Farrar, St. Louis, Mo., and Tillmon H. Pearson and Joseph R. Zietz, Jr., Baton Rouge, La., assignors to Ethyl Corporation, New York, N.Y., a corporation of Virginia
No Drawing. Filed Feb. 12, 1963, Ser. No. 257,872
5 Claims. (Cl. 260—437)

This invention relates to a process for the manufacture of organolead compounds. In particular, this invention is directed to an improved process for the manufacture of a tetraalkyllead.

This application is a continuation-in-part of co-pending application Serial No. 841,465, filed September 22, 1959 which was a continuation-in-part of application Serial No. 497,385, filed March 28, 1955, and both now abandoned.

The process employed in present commercial practice for the manufacture of tetraethyllead has been in use for a number of years and, in general, is satisfactory. However, it has certain disadvantages which are overcome by practicing our invention. It proceeds by reacting a sodium-lead alloy, of composition controlled to correspond substantially to NaPb, with ethyl chloride according to the following equation:

$$4NaPb + 4C_2H_5Cl \rightarrow (C_2H_5)_4Pb + 3Pb + 4NaCl$$

With the highest yields obtained thereby, only about 22 percent of the lead present in the NaPb alloy is converted to tetraethyllead. An inherent limitation in yield exists as is apparent from the consideration of the above equation. Thus, in this reaction at least 75 percent of the lead originally employed is not alkylated. Large quantities of lead must be recovered and reprocessed to NaPb alloy in order to make the process economical. Further valuable space in the reaction vessel is occupied by materials which are essentially inert for the manufacture of tetraethyllead under the present conditions and mode of operation.

Other processes for the production of organolead compounds, and in particular tetraethyllead, have been devised to consume the lead produced in the above equation. One such process is that described in U. S. Patent 2,535,190 wherein lead, as for example, that produced in the commercial process, is treated with metallic magnesium and ethyl chloride in the presence of a catalyst, preferably an alkyl ether. In this process as well as in the present commercial process, the tetraethyllead manufacturing operation is restricted by the necessary balance between the metallic sodium required and the organic chlorine in the ethyl chloride.

It is therefore an object of this invention to provide a process for the manufacture of organolead compounds which overcomes the above objections to the present commercial process and to those processes which have been proposed more recently as an improvement thereover. Particularly, it is an object of the invention to increase the conversion of lead to tetraethyllead above that obtained in present commercial practice.

These and other objects of the invention are accomplished by reacting an olefin with lead in a compound form capable of alkylation. Lead compounds used are of the general formula $PbR_4$ wherein each R is selected from the group consisting of hydrogen, alkyl, cycloalkyl, and aralkyl radicals. At least one of the R's is hydrogen and at least one of the other R's is selected from the group consisting of alkyl, cycloalkyl, aralkyl, and aryl radicals. The reaction is carried out at a temperature between about $-100°$ to $20°$ C., preferably $-60°$ to $0°$ C.

Preferably, the reaction is conducted at supra-atmospheric pressure, i.e., up to about 100 atmospheres.

The present process then provides for the manufacture of hydrocarbon-lead compounds by reacting a lead hydride compound as defined with an olefin at a temperature of from about $-100°$ to about $20°$ C. In many instances it is effective to generate the lead hydride or hydrocarbon lead hydride compounds in situ or in the same vessel as in the principal reaction. The hydrides so formed are then immediately alkylated to form the hydrocarbon lead compounds by feeding together with the olefin desired.

The hydrocarbon lead compounds employed can be generated in several ways. Most easily, they are made by reacting a hydrocarbon lead halide compound with lithium aluminum hydride, at relatively low temperatures. Thus, trimethyl lead hydride is made by reacting trimethyllead chloride and lithium aluminum hydride. Triethyllead hydride, dimethyllead dihydride, and diethyllead dihydride are similarly made. Lead salts reacting with hydrocarbon compounds of other metals, in the presence of hydrogen pressure, will generate variable proportions of hydrocarbon lead hydrides. In other cases, the hydrocarbon lead hydrides are made by low-temperature electrolysis. Thus, electrolysis of an aqueous caustic solution, using a spongy or high surface lead cathode, and in the presence of a film of moving ethylene gas, will provide ethyl lead hydrides.

In certain embodiments of the process, the $PbR_4$ compound is formed, and then reacted, in the same reaction zone, with an olefin. Thus, the reaction of this embodiment can involve the reaction of an active form of lead, e.g., lead metal (preferably with an alloying metal), lead alloys, or lead salts with hydrogen, olefin, and an alkyl halide or metal alkyl. In the above reactions, various partially alkylated lead intermediates or poly lead organo compounds are formed and these are reacted with hydrogen to form alkyllead hydrides, which are then reacted with the olefin to give the desired tetraalkyllead compound.

The products which can be made from the process of this invention include tetraethyllead, tetrapropyllead, tetraisopropyllead, tetrabutyllead, tetraisobutyllead, tetraoctyllead, tetraphenethyllead, triethylpropyllead, diethyl dipropyllead, ethyl tripropyllead, triethyl butyllead, triethyl octyllead, trioctyl cetyl lead, diethyl propyl butyl lead, triethyl phenethyllead, ethyl triphenyl lead, and the like.

Tetraethyllead can be prepared by reaction of an active form of Pb (e.g., finely divided lead in admixture with finely divided magnesium) and hydrogen to give ethyl lead hydrides for reaction with ethylene. Tetrabutyllead can be made by reaction of butyl lead hydride compounds with α-butylene. Likewise, higher alkyl, cycloalkyl, aralkyl or aryl derivatives, or compounds containing any combination of these derivatives, can be prepared by reaction of hydrocarbon lead hydride compounds with olefins or mixtures of olefins. Thus, a variety of organolead compounds can be made by the present process and several of such compounds can be made from a variation of starting materials. In some cases, it is useful to employ a metal, such as nickel, platinum and palladium in the reaction or toward the end of the reaction to terminate or control the alkylation to give the desired end product or products. The concentration of metal for this purpose can be 0.01 to 1 percent based upon the weight of the reactants.

Pressures of olefin and hydrogen can be used in the reactor up to about 700 atmospheres or higher. The most preferred operation is obtained using olefin pressures ranging from 5 to 350 atmospheres. Hydrogen pressures, in stepwise operations in which hydride bonds are formed first, should range from 5 to 500 atmospheres, preferably 10 to 300 atmospheres. The olefin and hydrogen may, or may not, be present in the reaction zone at any single time, in the stoichiometric proportions required for the reaction desired. This depends on the pressures employed, and the volumetric distribution of reaction space to solid-liquid phase and gas phase. If a relatively small amount of gas space is available, additional gaseous reactants, i.e., hydrogen and/or ethylene are fed during the course of the reaction to maintain the desired pressure.

The reaction can be carried out in a solvent or suspension. Ethers can be employed in this capacity as well as alkyl halides and hydrocarbons, such as hexane, octane, decane, toluene and xylene. Either aliphatic or aromatic ethers are suitable as solvents or suspending agents for the reaction. Typical examples are diethyl ether, dipropyl ether, dibutyl ether, methyl phenyl ether, dioxane and the like. When using pressure operation, dimethyl ether is also suitable. In general, the solvent or suspending agent should have a different volatility from the tetraalkyllead product to permit easy separation of the reaction mixture. For this purpose, the solvent or suspending agent can be either more volatile or less volatile than the product. Suitable alkyl halide solvents or suspending agents are ethyl chloride, ethyl bromide, ethyl iodide, propyl chloride, octyl chloride and the like.

The process can be carried out in either a batch or continuous operation. In some cases, continuous processing is desired for economic reasons. The reaction time varies both with reactants and operating conditions. In general, reaction periods between 30 minutes and 20 hours are normally required. The reaction period is controlled to give the desired degree of addition of olefin to the metalloorganic reactant or intermediate product.

A wide variety of olefins are suitable for the present invention. In addition to ethylene, other substituted and branched olefins are suitable such as propylene, α-butylene, α-hexylene, styrene, α-dodecylene, and cyclohexene.

As pointed out above, suitable lead-containing reactants for the present process have the general formula $PbR_4$ wherein at least one R is hydrogen, and at least one of the other R's is alkyl, cycloalkyl, aralkyl or aryl radical. Typical examples of such reactants are trimethyllead hydride, triethyllead hydride, diethyllead dihydride, ethyl lead trihydride, tributyllead hydride, butyl lead trihydride, dioctyl lead dihydride, trimethyl ethyl lead, dimethyl dibutyllead, trimethyl octyllead, hexaethyl dilead, and the like.

Suitable aryl radical containing reactants are triphenyl lead hydride, tri-tolyl lead hydride, and ditolyl lead dihydride.

The present invention makes it possible to replace the basic reactants of the prior art process, sodium-lead alloy and an alkyl chloride, with other reactants, from which the hydrocarbon lead hydride used in the present process is made. Thus, lead tetrachloride and tetraethyllead can be reacted at low temperatures to form ethyl lead chlorides, which are readily convertible to ethyl lead hydrides. Similarly, lead dichloride can be reacted with triethyl aluminum at low temperatures, preferably below −20° C., to form triethyllead chloride, which is converted to triethyllead hydride, for the present process.

Other known reactions for tetraalkyllead compounds can result in production, as part of the products, of partially alkylated or hydride co-products, although such by-products are not indicated as part of the product in these equations.

(1) 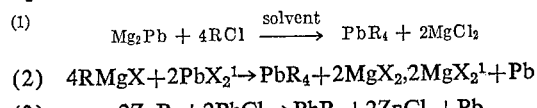

(2) $4RMgX + 2PbX_2^1 \rightarrow PbR_4 + 2MgX_2, 2MgX_2^1 + Pb$ (3) $2ZnR_2 + 2PbCl_2 \rightarrow PbR_4 + 2ZnCl_2 + Pb$ Such processes are fully discussed in U.S. Patents 2,535,190, 2,535,235, and 1,690,075. In such cases, the hydrocarbon lead hydride components are reacted with an olefin according to the present invention.

The following are typical examples which illustrate the present invention but should not be construed as limiting the same in any way. All quantitative units in the following examples are in parts by weight except where otherwise specified.

*Example 1*

Triethyllead hydride, 120 moles, is dissolved in 1000 moles of toluene and charged into a pressure autoclave, and the temperature is reduced to a value below that at which a significant amount of reaction occurs. One hundred twenty (120) moles of pure, dry, ethylene is now introduced. The autoclave is now sealed off, and the temperature is now raised to −50° C. for one hour. The pressure is maintained at about 100 atmospheres. After one hour a significant pressure drop is noted. The autoclave is now allowed to warm, the excess gases are vented, and the product, tetraethyllead, mixed with small quantities of higher homologs, is then filtered to separate the organo-lead products from the co-products. Tetraethyllead is recovered in pure form by vacuum separation or distillation (5 mm). The tetraethyllead product is obtained in high yields.

*Example 2*

When Example 1 is repeated except that trimethyllead hydride is substituted for the triethyllead hydride similar results are obtained. The products include ethyl trimethyllead of high purity.

*Example 3*

A solution of 280 moles of pentaethyldilead hydride in 1,800 parts of toluene is introduced into a high-pressure autoclave, which is then pressurized with pure, dry ethylene (280 moles). The autoclave is now sealed off, and the synthesis is completed as indicated in Example 1, similar results being obtained. The product gives a high yield of hexaethyldilead. 280 moles of ethylene and 140 moles of hydrogen are then added to the autoclave. A high purity tetraethyllead product results.

In addition to the foregoing examples, various other demonstrations are conducted as shown in the following table. In each of the following examples 100 moles of a hydride compound is dissolved in 1,000 moles of solvent and the mixture or solution charged into an autoclave. Equimolar quantities of ethylene (except in Example 5 where double this quantity of ethylene is charged) are then passed into the autoclave while the conditions are maintained for two hours at the temperature and pressure shown opposite each run. The primary products obtained are shown opposite each run.

| Example | Reactants | Solvent | Temp. press. | Products |
| --- | --- | --- | --- | --- |
| 4 | Triphenyllead hydride. Ethylene. | Diethylene glycol dimethyl ether. | −50° C. 60 atm | Triphenylethyllead. |
| 5 | Dimethyllead dihydride. Ethylene. | Diethyl ether | −60° C. 50 | Dimethyl diethyllead. |
| 6 | Pentamethyl dilead hydride. α-Butylene. | 1,2-dimethoxy ethane | 0° C. atm | Pentamethyl butyl dilead. |

The procedures described in the foregoing examples are susceptible of a large number of variations and modifications, some of which are discussed below.

When, in Example 1, illustratively, propene, α-butene, α-hexene, α-octene, α-dodecene, styrene, or cyclohexene is employed, similar results are obtained, except that the corresponding higher lead alkyl, or a homolog thereof, is formed. Non α-olefins, that is, olefins which do not contain a terminal double bond, can also be used but, in general, they react much more slowly than the α-olefins.

The temperatures, reaction pressures, and ratio of reactants can be varied within relatively wide limits and good results are obtained. For example, temperatures of −100°, −50°, and up to about 20° C., and operating pressures of 50, 100, and 200 atmospheres can be employed.

We claim:

1. The process for the manufacture of hydrocarbon lead compounds consisting of feeding together an alpha mono olefin having up to four carbon atoms and a lead hydride compound having the formula $$PbR_4$$

wherein each R is selected from the group consisting of hydrogen, alkyl, cycloalkyl, aryl, and aralkyl radicals, at least one of the R's is hydrogen and at least one of the other R's is selected from the group consisting of alkyl, cycloalkyl, aralkyl, and aryl radicals, and reacting at a temperature of from about −100 to about 20° C.

2. The process of claim 1 wherein said lead hydride is a trialkyllead hydride compound.

3. Process for the manufacture of tetraethyllead consisting of feeding together ethylene and triethyllead hydride and reacting at a temperature of from about −100° to about 20° C. and at supra-atmospheric pressure.

4. Process for the manufacture of ethyl trimethyllead consisting of feeding together trimethyllead hydride and ethylene and reacting at a temperature of from about −100° to about 20° C. and at supra-atmospheric pressure.

5. The process of making a tetraalkyllead compound comprising reacting together a tetraalkyllead and lead tetrachloride, forming thereby alkyllead chlorides, then converting the so-formed alkyllead chloride, by reaction with lithium aluminum hydride, to the corresponding alkyllead hydride, then reacting the alkyllead hydride with an alpha olefin and forming thereby a tetraalkyllead product.

No references cited.